Aug. 20, 1963    L. W. SCHMIDT    3,101,123
PLANT THINNING IMPLEMENT
Filed Aug. 22, 1960    2 Sheets-Sheet 2
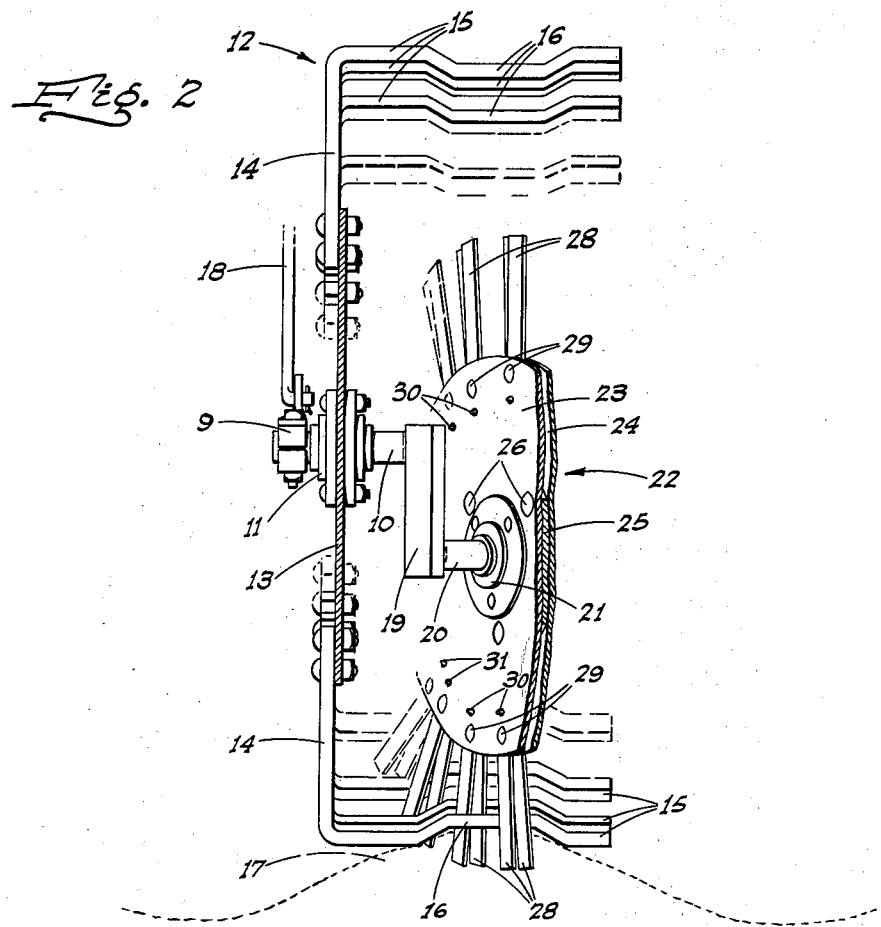
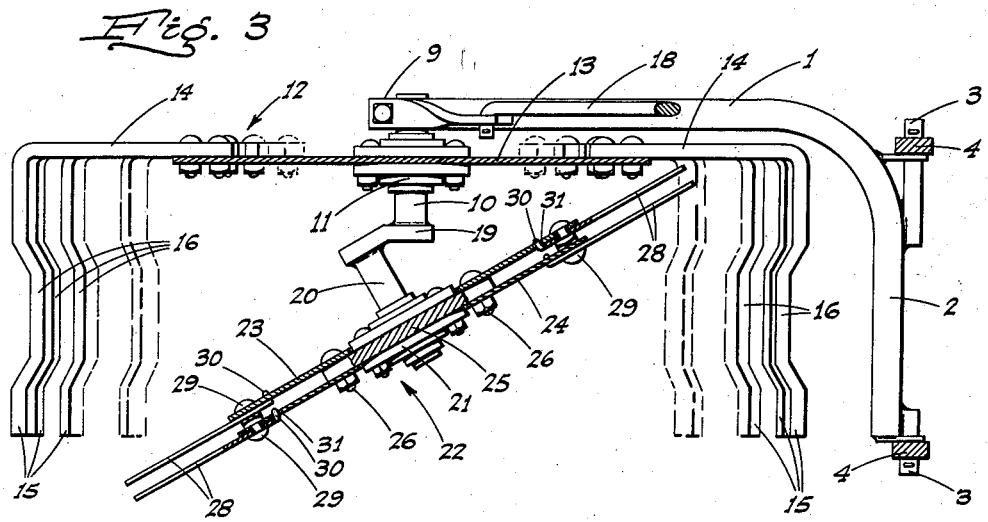

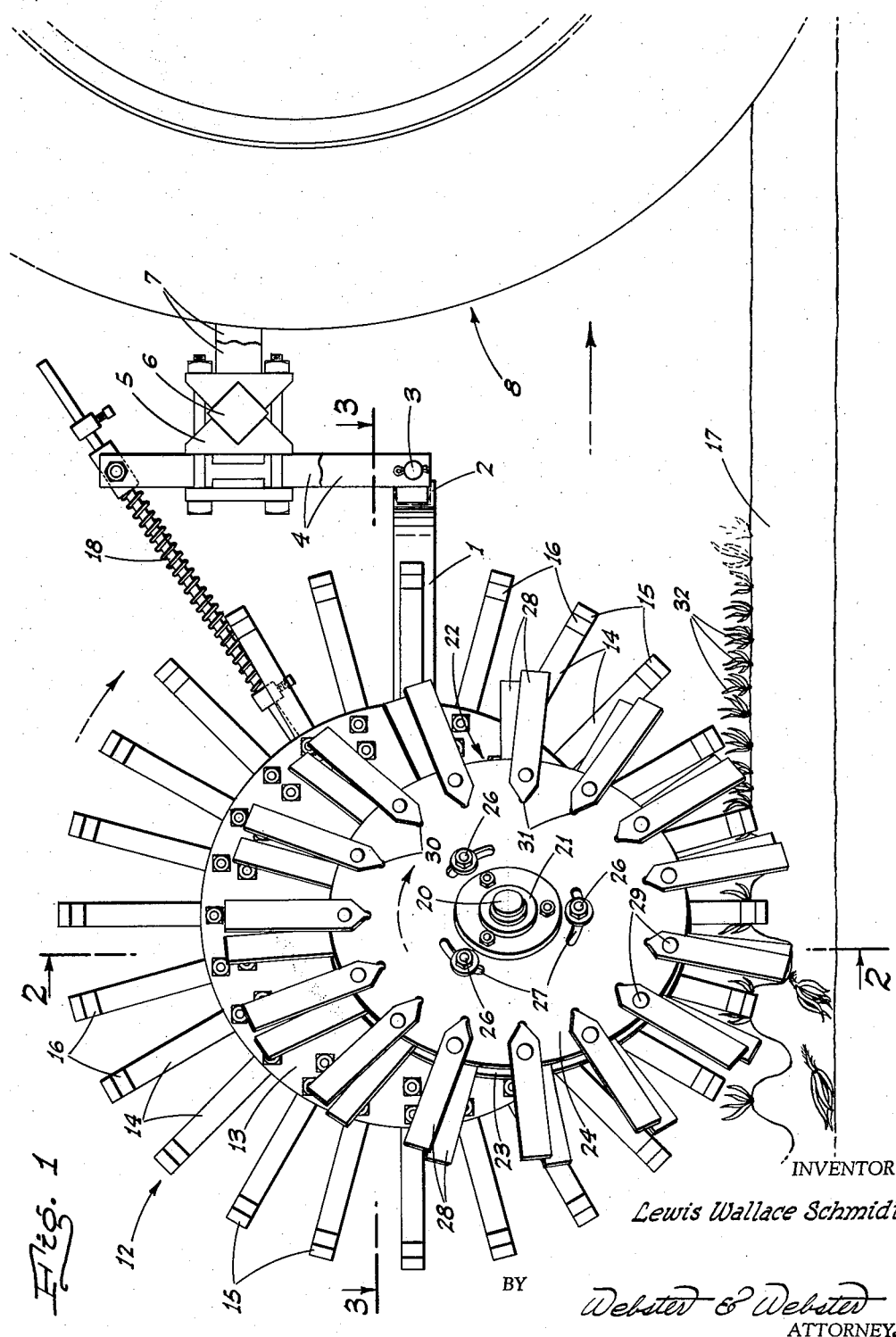

_United States Patent Office_

3,101,123
Patented Aug. 20, 1963

3,101,123
PLANT THINNING IMPLEMENT
Lewis Wallace Schmidt, Rio Vista, Calif., assignor to Blackwelder Manufacturing Co., Rio Vista, Calif., a corporation of California
Filed Aug. 22, 1960, Ser. No. 51,001
6 Claims. (Cl. 172—556)

This invention relates in general to an agricultural implement, and particularly is directed to an improved rotary type thinner or blocker for use on crop rows.

Certain crops, as for example sugar beets, are seeded quite heavily in rows and after reaching early growth excess plants are removed, by thinning or blocking, at points such that other plants remain in individually and substantially equally spaced relation in each row so as to permit of uncrowded growth to maturity.

It is the major object of the present invention to provide a novel implement for such purpose; such implement including—in combination—one ground engaging rotor which rides, as the implement advances, on the crop row and successively holds down the soil at, as well as shields, each plant to be retained, and another ground engaging rotor which works through the crop row to remove or block out the excess and unshielded intermediate plants.

Another important object of the invention is to provide a plant thinning implement, as above, in which the rotors—which are ground-driven and mounted in cooperative relation—are each of novel construction; such one rotor including a plurality of circumferentially spaced, transversely extending feet which successively ride in soil hold-down relation on the plants to be retained, while the other rotor includes a plurality of circumferentially spaced, radial blades which sweep across the crop row between the feet of said one roller to block out the intermediate plants.

It is also an object of the invention to provide a practical, reliable, and durable plant thinning implement, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the implement as in use.

FIG. 2 is a transverse sectional elevation on line 2—2 of FIG. 1.

FIG. 3 is a sectional plan on line 3—3 of FIG. 1.

Referring now more particularly to the drawings, and to the characters of reference marked thereon, the implement comprises a laterally offset, longitudinally extending draft beam 1 which includes—at the front—an inwardly projecting cross bar 2; such cross bar being fitted at the ends with transversely alined trunnions 3. The trunnions 3 are pivotally engaged in the lower end portions of upstanding posts 4 secured, intermediate their ends, by clamps 5 to the tool bar 6 carried on draft arms 7 of a tractor, indicated generally and in part at 8.

At its rear end the laterally offset, longitudinal draft beam 1 is clampingly engaged, as at 9, with a horizontal, inwardly projecting stub shaft 10 disposed at a right angle to the line of draft.

Such stub shaft 10 is provided with a bearing 11 which carries a ground engaging, plant shielding rotor, indicated generally at 12. The rotor 12 includes a disc 13 fixed centrally on the bearing 11, and at its periphery such disc 13 carries a plurality of equally circumferentially spaced, radially outwardly projecting arms 14. At their outer ends the radial arms 14 each merge in integral relation with a laterally inwardly extending plant shielding shoe 15; the shoes—intermediate their ends—being radially inwardly offset, as at 16, so as to straddle the top portion of the ridged crop row 17 along which the implement is adapted to travel, and on which the rotor 12 rides in ground driven relation.

A forwardly and upwardly inclined, yieldable, spring-urged, thrust rod unit 18 is pivotally connected between the rear end portion of the draft beam 1 and the upper end of the corresponding one of the posts 4. The thrust rod unit 18 serves the purpose of manufacturing the rotor 12 in positive engagement on the ridged crow row 17 as the implement advances, but permits the implement to rise and fall with any variation in the elevation of said crop row.

At its inner end the stub shaft 10 is rigidly secured to a depending bracket 19, and another horizontal stub shaft 20 is fixed to the lower end of said bracket; the stub shaft 20 extending at a forward diagonal relative to the direction of travel.

The stub shaft 20 is provided with a bearing 21, and which bearing supports a plant thinning rotor, indicated generally at 22; such rotor 22 being smaller in diameter than the rotor 12 and in the main being disposed within the confines of the latter. By reason of the forward diagonal of stub shaft 20, the rotor 22—from the front thereof—extends at a rearward diagonal.

The rotor 22 includes an inner disc 23 and an outer disc 24; such discs being attached to a central mounting plate 25, of bearing 21, by means of circumferentially spaced bolts 26. The bolts 26 extend through elongated, circumferential slots 27 in the outer disc 24, whereby such disc may be rotatably adjusted relative to the inner disc 23 for the purpose hereinafter described.

The discs 23 and 24 are each provided with a plurality of radially outwardly projecting, equally circumferentially spaced, blades 28, each such blade being secured to the corresponding disc by a bolt 29 and inwardly thereof by a lateral tip 30 extending through a hole 31.

The corresponding blades 28 on the discs 23 and 24 comprise working pairs, and the disc 24 is adjusted so that the blades of each such pair are somewhat circumferentially staggered or offset.

The extent of radial projection of the blades 28 is such that each pair thereof projects—at the bottom of the rotor—between and to a point below a corresponding pair of the plant shielding shoes 15 (see FIG. 2).

In operation of the above described implement the rotor 12 rides on the ridged crop row 17, being ground-driven as the implement advances; the shoes 15, at the bottom of rotor 12, resting on the ridged crop row 17, with the offsets 16 straddling the top portion of such row. With advance of the rotor 12 along the crop row 17 the shoes 15, at the bottom of said rotor, engage in soil hold-down relation and on longitudinally spaced ones of the plants 32 in such row. At the same time the rotor 22—which is likewise ground-driven—rotates, and with such rotation related pairs of the blades 28 sweep transversely through the crop row 17, between adjacent plant shielding shoes 15, and block out the intermediate excess plants—all as illustrated in FIG. 1. Thus, with advance of the implement the shoes 15 successively shield the plants 32 to be retained, while the blades 28 successively remove all of the intermediate excess plants.

The width of the block cut through the crop row 17 by each pair of the blades 28 is predetermined by adjusting the disc 24 to either increase or decrease the circumferential staggering or offsetting of the blades of each pair.

While the shoes 15, when in engagement with the corp row 17, bear directly on the plants 32 to be retained, the crushing effect—minimized by the offsets 16—has been found to be insufficient to prevent further and normal growth of such plants to maturity.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention the following is claimed as new and useful, and upon which Letters Patent are desired:

1. A thinning implement, for plants in a crop row, comprising an above-ground draft structure, a pair of horizontal shafts mounted on the draft structure, one shaft extending at a right angle and the other shaft at a diagonal to the crop row, one rotor journaled on the right angle shaft and another rotor journaled on the diagonal shaft, said one rotor including at its periphery a plurality of circumferentially spaced shoes adapted to rest at the bottom of said rotor in soil hold-down relation on longitudinally spaced plants to be retained, and said other rotor including a plurality of circumferentially spaced radially outwardly projecting blades which extend downwardly between and to a termination below adjacent shoes of said one rotor at the bottom thereof; both rotors being ground driven and upon simultaneous rotation thereof the blades of said other rotor sweep transversely through the crop row between said adjacent shoes whereby to block out plants intermediate those to be retained.

2. A thinning implement, for plants in a crop row, comprising a longitudinal draft beam offset laterally relative to the crop row, one horizontal stub shaft fixed on and projecting in a direction inwardly from the draft beam at a right angle to the crop row, a rigid bracket depending from the free end of said stub shaft, another horizontal stub shaft fixed on and projecting in the same direction from the lower end of the bracket but at a diagonal to the crop row, a plant shielding rotor journaled on said one shaft for ground engagement on and movement along the crop row, and a plant blocking rotor journaled on said other shaft for ground engagement and simultaneous rotation with the plant shielding rotor; the latter including at its periphery a plurality of circumferentially spaced shoes adapted to rest at the bottom of said rotor in soil hold-down relation on longitudinally spaced plants to be retained, and said plant blocking rotor including a plurality of circumferentially spaced radially outwardly projecting blades which extend downwardly between and to a termination below adjacent shoes of said one rotor at the bottom thereof, so that said blades, upon such simultaneous rotation of the rotors, sweep transversely through the crop row between said adjacent shoes whereby to block out plants intermediate those to be retained.

3. A thinning implement, for row-crop plants, comprising an above-ground draft structure, a plant thinning rotor journaled on the draft structure with its axis diagonal to the crop row and including circumferentially spaced thinning blades, and a plant shielding rotor journaled on the draft structure to one side of the thinning rotor and including a plurality of circumferentially spaced plant engaging shoes projecting laterally across the crop row and successively bearing down on longitudinally spaced plants to be retained as the implement advances; the bottom blades of the thinning rotor projecting between adjacent ones of the plant engaging shoes.

4. A thinning implement, for plants in a crop row, comprising a longitudinal draft beam offset laterally relative to the crop row, one horizontal stub shaft fixed on and projecting from the draft beam in a direction toward and at a right angle to the crop row, a rigid bracket secured to and extending downwardly from the free end of said stub shaft, another horizontal stub shaft fixed on and projecting in the same direction from the lower end of the bracket but with its axis disposed at an acute angle to the crop row in a forward direction relative to the direction of movement of the implement, a plant shielding rotor turnably mounted on the one shaft and including a plurality of circumferentially spaced elongated shoes adapted to extend laterally across the crop row at the bottom of the rotor and to then rest in soil hold-down relation on plants to be retained, said shoes being disposed in planes parallel to said one shaft, and a plant blocking rotor turnable on said other shaft and including radial outwardly projecting blades spaced apart circumferentially substantially the same as the spacing of the shoes and at the bottom of the rotors, projecting between adjacent shoes, and terminating below the same.

5. A thinning implement, for plants in a crop row, comprising a draft beam, one horizontal stub shaft fixed on the beam and projecting laterally therefrom in a direction toward and at a right angle to the crop row, another stub shaft rigid with the one shaft and projecting laterally therefrom in the same direction as the one shaft but disposed with its axis at an acute angle to the axis of the one shaft in a forward direction, a plant shielding rotor turnably mounted on the one shaft and including a plurality of circumferentially spaced shoes adapted to extend at the bottom across the plant row in spaced-plant shielding relation, and a plant blocking rotor turnably mounted on the other shaft and including circumferentially spaced blades adapted at the bottom of the rotors to cooperate with the adjacent shoes to engage and thin out unshielded plants.

6. A thinning implement, for plants in a crop row, comprising a draft beam, one horizontal stub shaft fixed on the beam and projecting laterally therefrom in a direction toward and at a right angle to the crop row, another stub shaft rigid with the one shaft and projecting laterally therefrom in the same direction as the one shaft but disposed at a level below that of the one shaft with its axis at an acute angle to the axis of the one shaft in a forward direction, a plant shielding rotor turnably mounted on the one shaft and including a plurality of circumferentially spaced shoes adapted to extend at the bottom of the rotor across the plant row in spaced-plant shielding relation, and a plant blocking rotor turnably mounted on said other shaft and smaller in diameter than the shielding rotor; said blocking rotor including a plurality of thinning blades adapted at the bottom of the rotor to project between and below the adjacent shoes of the shielding rotor.

References Cited in the file of this patent

UNITED STATES PATENTS

| | | |
|---|---|---|
| 954,149 | Thomas | Apr. 5, 1910 |
| 1,016,110 | Stone | Jan. 30, 1912 |
| 1,081,437 | Long | Dec. 16, 1913 |
| 1,775,711 | Aitkenhead | Sept. 16, 1930 |
| 2,599,845 | Kramer | June 10, 1952 |

FOREIGN PATENTS

| | | |
|---|---|---|
| 1,018,667 | Germany | Oct. 31, 1957 |